United States Patent [19]

Hall

[11] Patent Number: 5,580,103

[45] Date of Patent: Dec. 3, 1996

[54] COUPLING DEVICE

[75] Inventor: James C. Hall, San Jose, Calif.

[73] Assignee: Furon Company, Laguna Niguel, Calif.

[21] Appl. No.: 448,828

[22] Filed: May 24, 1995

Related U.S. Application Data

[63] Continuation-in-part of Ser. No. 276,925, Jul. 19, 1994, Pat. No. 5,482,618.

[51] Int. Cl.$^6$ ...................................................... F04B 49/06
[52] U.S. Cl. ............................ 285/93; 285/354; 285/331; 70/46
[58] Field of Search ........................................ 285/917, 354, 285/93, 531, 332, 341; 73/40, 46; 340/619

[56] References Cited

U.S. PATENT DOCUMENTS

| | | | |
|---|---|---|---|
| 1,468,187 | 9/1923 | Werbeck | 285/917 |
| 1,537,755 | 5/1925 | Dowling | 285/917 |
| 1,567,813 | 12/1925 | Oleson | 285/917 |
| 1,583,126 | 5/1926 | Crane | 285/917 |
| 1,715,854 | 6/1929 | McKenzie-Martyn | 285/917 |
| 1,906,826 | 5/1933 | Smith et al. | 285/917 |
| 2,050,137 | 8/1936 | Walsh | 285/917 |
| 5,090,871 | 2/1992 | Story et al. | 285/93 |
| 5,343,736 | 9/1994 | Cady et al. | 73/40 |
| 5,355,908 | 10/1994 | Berger et al. | 285/354 |
| 5,482,618 | 1/1996 | Hall | 210/85 |

*Primary Examiner*—Eric K. Nicholson
*Attorney, Agent, or Firm*—Fay, Sharpe, Beall, Fagan, Minnich & McKee

[57] ABSTRACT

O-ringless coupling device including a pair of junction elements for attachment to the ends of flow lines to be connected and a coupling nut. One of the elements is provided with a coupling face having at least one annular groove formed therein circumscribing the fluid passageway. The sidewalls of the groove or grooves are angularly inclined relative to each other so that the width of the groove decreases with depth. The opposing face of the second junction element is provided with an annular rib, the transverse thickness of which is adapted to mate with the opposing groove of the first element such that when the nut is used to draw the two junction elements together, the rib mates with the groove and forms a seal therebetween. Preferably, the distal extremity of the rib is narrower than the proximal extremity and is of a dimension such that the walls of the annular rib mate with the walls of the annular groove such that coupling pressure wedges them together forming pressure seals at the engaging sidewalls. In a dual annular sealing configuration, either or both of the junction elements may include an annular channel formed between the inner and outer annular sealing mechanisms, so as to retain and distribute any fluid leaking through the inner sealing mechanism. In a leak trace embodiment, a suitable leak sensor may be extended into sensing communication with the channel.

2 Claims, 3 Drawing Sheets

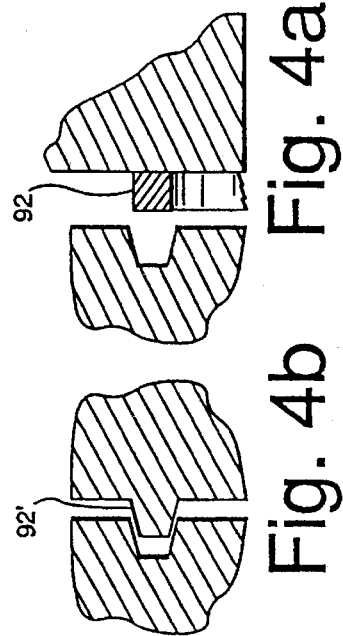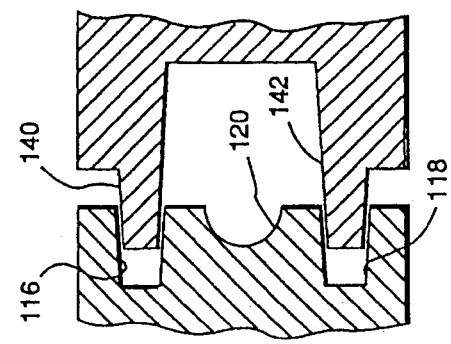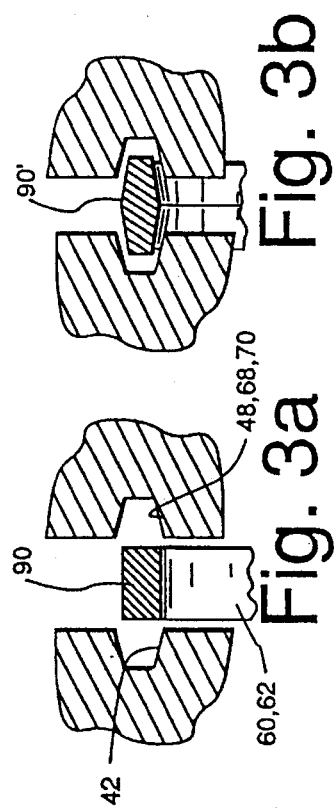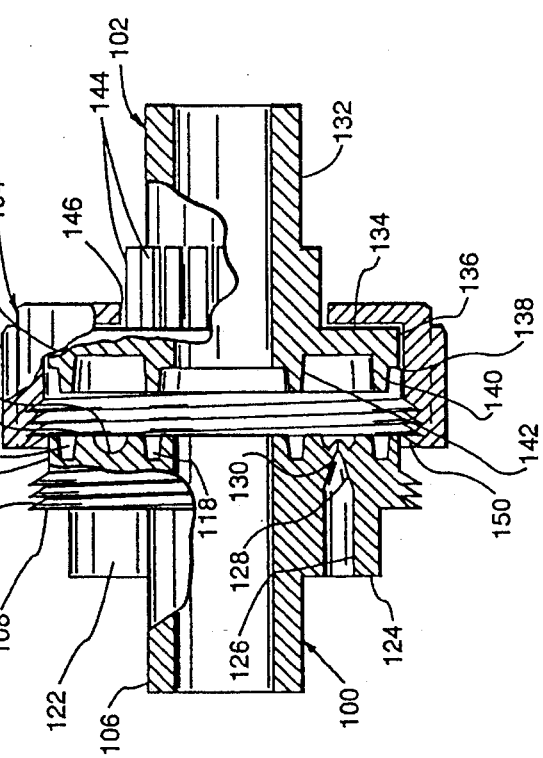

COUPLING DEVICE

This application is a continuation-in-part of my application entitled "FLOW-THROUGH, IN-LINE FILTER HOUSING", U.S. Ser. No. 08/276,925 filed Jul. 19, 1994, and assigned to the assignee of the present invention now U.S. Pat. No. 5,482,618.

BACKGROUND OF THE INVENTION

1. Field of the Invention

The present invention relates generally to union apparatus for joining fluid-handling lines, and more particularly to an improved fluid flow-line coupling device having double sealing and leak trace capability.

2. Brief Description of the Prior Art

While pipeline union couplers and other couplers associated with filters, pumps, valves, etc., have long been used in water lines, fuel lines, chemical supply lines, etc., such couplers have typically depended upon the clamping together of either two planar or frusto-conically configured annular surfaces with or without O-rings. Such unions, however, are subject to leakage if not tightly clamped together or if the O-rings either have failed or lost their resiliency. Moreover, resilient O-rings can leach out in certain chemicals. For applications in which leak detection is required, a dual O-ring configuration having an intermediate groove and leak trace has been used. One such embodiment is disclosed in U.S. Pat. No. 5,090,871 issued to Carl E. Story and Kenneth M. O'Connor entitled "Junction Assembly With Leak Detection Means." While such dual O-ring structure was suitable for many applications, the dependency upon O-ring integrity and clamping force uniformity left room for improvement. One such improvement is disclosed in my co-pending application entitled "FLOW-THROUGH, IN-LINE FILTER HOUSING" (Ser. No. 08/276,925 filed Jul. 19, 1994 now U.S. Pat. No. 5,482,618) in which it is disclosed that, as an alternative to using O-rings, one can provide one or more tapered annular grooves on the face of one coupling part and either affix to, or make integral with, an opposing face of another part, an outwardly projecting rib or ridge of either rigid, resilient or deformable material which will mate with the annular groove and provide a reliable sealing mechanism between two fluid flow-line junction elements.

SUMMARY OF THE INVENTION

It is therefore a principal objective of the present invention to provide an improved union assembly and coupling device having substantially universal application.

Another object of the present invention is to provide an improved union or coupling device which can be molded from suitable plastics or metallic materials and used to join flow-lines together without the need for torque-applying wrenches.

Still another object of the present invention is to provide a novel dual-sealed union device having leak trace capability.

A further objective of the present invention is to provide a moldable union device in which a minimum of clamping force is required to achieve a leakless seal.

Briefly, a presently preferred embodiment of the present invention includes a pair of junction elements for attachment to the ends of flow lines to be connected and a coupling nut. A first element is provided with a coupling face having at least one annular groove and preferably a plurality of annular grooves formed therein circumscribing the fluid passageway. The sidewalls of the groove or grooves are angularly inclined relative to each other so that the transverse width of the groove decreases with depth. The opposing face of the second junction element is provided with a mating annular rib or ribs, the transverse dimensions of which are selected such that each rib mates with an opposing groove of the first element whereby when the nut is turned to draw the two junction elements together, the sidewalls of each rib mate with the sidewalls of a corresponding groove and form seals therebetween. Preferably, the transverse dimension of the distal extremity of each rib is narrower than the proximal extremity and is such that the walls of each rib mate with the walls of a corresponding groove such that the coupling pressure wedges them together forming pressure seals at the engaging sidewalls. In a dual sealing configuration, either or both of the junction elements may include an annular channel formed between the inner and outer annular sealing ribs/grooves, so as to retain and distribute any fluid leaking through the inner sealing junction. In a leak trace embodiment, a suitable leak sensor may be extended into sensing communication with the channel.

An important advantage of the present invention is that it provides a simple single or multiple union type of coupling device having universal application.

Another advantage of the present invention is that it provides a coupling device of the type described which can be sealingly engaged without the use of tools.

Still another advantage is that, by adding additional rib/groove pairs, higher degrees of sealing can be achieved.

These and other advantages of the present invention will no doubt become apparent to those skilled in the art after having read the following detailed description of the preferred embodiment which is illustrated in the several figures of the drawing.

IN THE DRAWING

FIGS. 3a and 3b are partial cross-sectional views illustrating alternative types of sealing configuration using sealing rings of rectangular and diamond-shaped cross-section with tapered grooves;

FIGS. 4a and 4b are a partial cross-sectional views illustrating alternative forms of rib-and-groove O-ringless seals in accordance with the present invention;

FIG. 5 is a partially cut-away illustration of a coupling union in accordance with the present invention; and FIG. 6 is an exploded detail illustrating engagement of the rib-and-groove sealing mechanisms depicted in FIG. 5.

DETAILED DESCRIPTION OF THE PREFERRED EMBODIMENT

Figure 1:
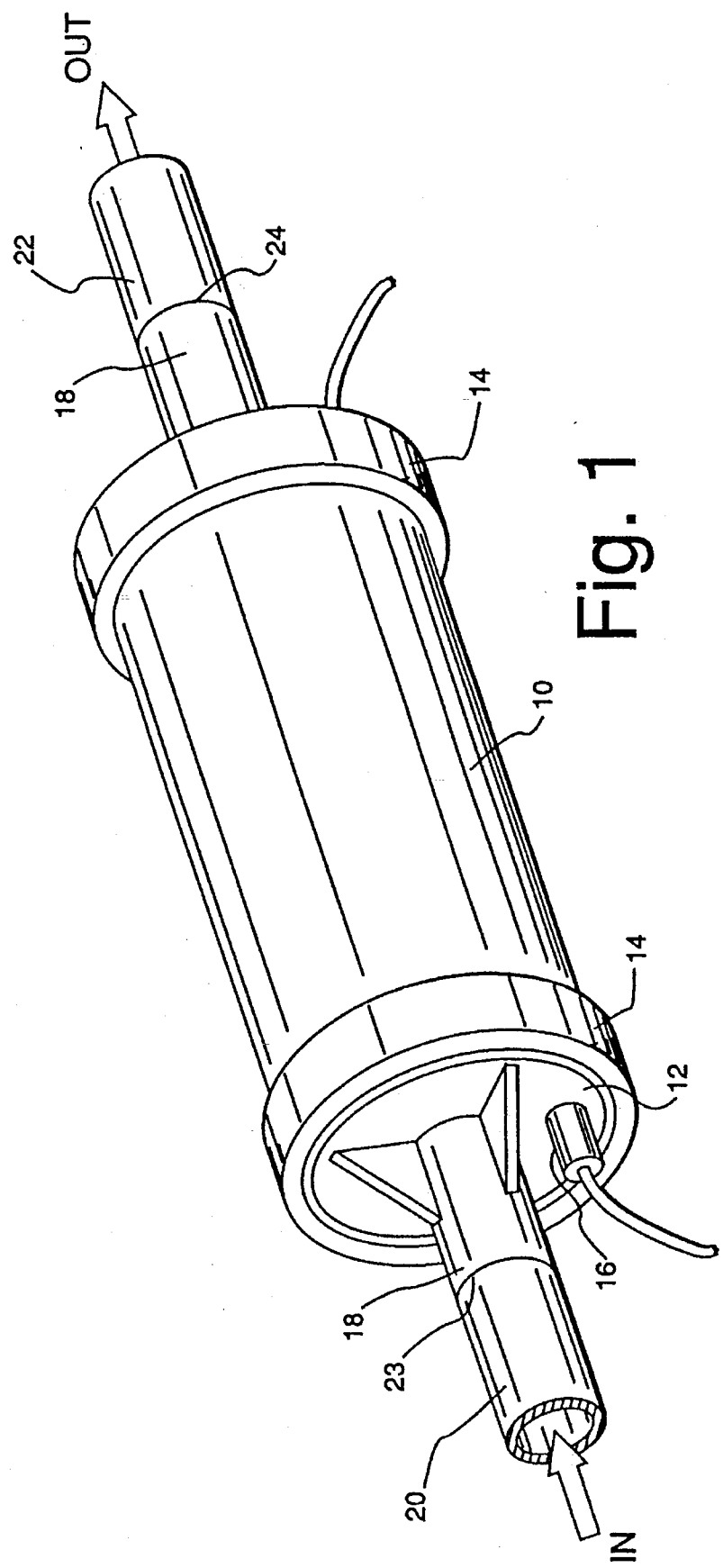
FIG. 1 is a perspective view illustrating a filter assembly utilizing a junction structure in accordance with the present invention.

Referring now to FIG. 1 of the drawing, a flow-through in-line filter assembly is illustrated including a filter housing barrel 10, a pair of end caps 12, and a pair of coupling nuts 14. Extending into apertures formed in each end cap 12 (only one of which is shown) is a leak trace detector 16 which will be described below. As will also be further described below, the cylindrical nipples 18, formed integral with each end cap 12, may be either removably or fixably attached, as by gluing, welding, fusing or the like, to an inlet conduit 20 and an outlet conduit 22, as indicated at 23 and 24, respectively.

Figure 2:
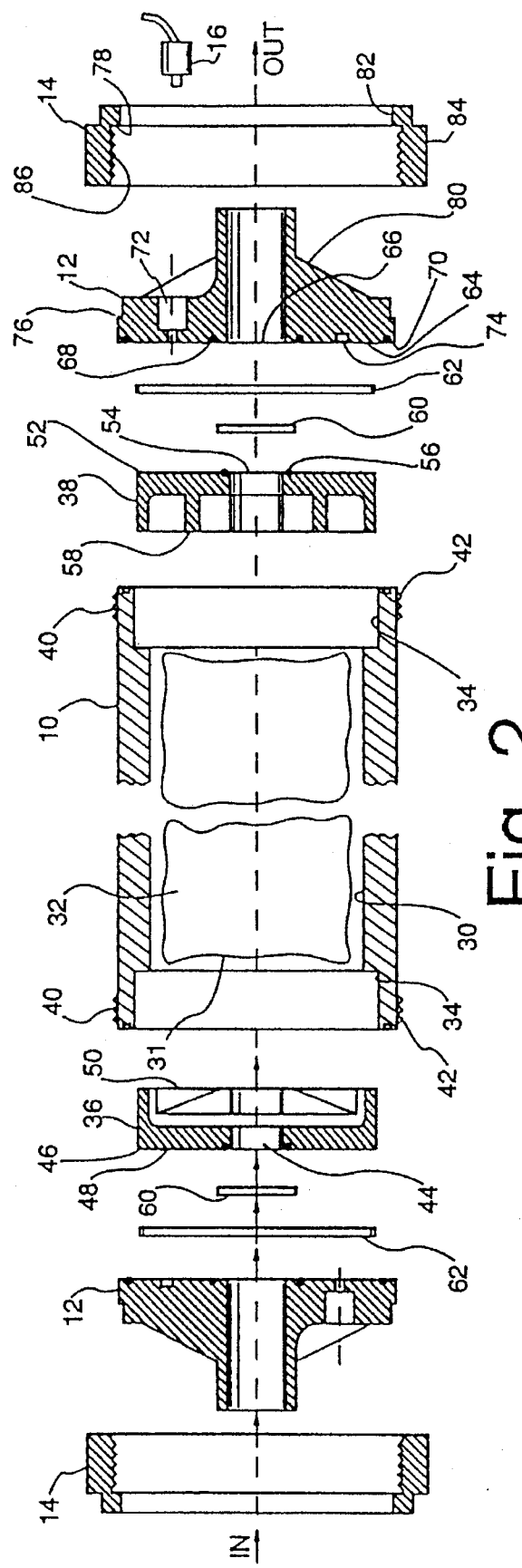
FIG. 2 is an exploded longitudinal, cross-sectional view illustrating the several components of the filter assembly illustrated in FIG. 1.

In FIG. 2 of the drawing, which is an exploded longitudinal cross-section of the embodiment depicted in FIG. 1, it will be noted that the barrel 10 is formed of an elongated cylindrical body having a first cylindrical bore 30 forming a chamber for receiving a filter element 32. At each end of the barrel 10 is a counter-bore 34 of a larger diameter than the bore 30, such bores being respectively adapted to receive an input flow diffuser 36 at one end and a filter element adaptor 38 at the other end. In accordance with one embodiment, each end of barrel 10 is externally threaded, as indicated at 40, and includes an annular seal-receiving or seal-forming groove 42 formed in its end face. Alternatively, and as will be described below, the groove 42 could be an annular rib adapted to mate with a corresponding groove in end cap 12 so as to form an O-ringless seal.

The flow diffuser 36 is a circular body having a central aperture 44 for receiving an input flow of liquid or gas, and has an outer diameter suitable for mating with the bore 34 of barrel 10. The outer surface 46 of one side is smooth with the exception of at least one annular seal-receiving or seal-forming groove 48. The opposite side 50 is variously configured to form flow paths serving to diffuse the input flow of gas or liquid so that it is more or less evenly distributed over the input end surface 31 of filter element 32.

The adaptor 38 is of similar size and configuration to that of diffuser 36 in that its outer diameter is adapted to mate with the bore 34 at the other end of barrel 10, and its outer surface 52 is smooth, with the exception of a central aperture 54 and at least one annular seal-receiving groove 56. The opposite side 58 of adaptor 38 is configured to suitably engage the downstream end of the filter element 32 and direct the filtered flow of gas or liquid through the opening 54.

Annular inner and outer seals 60 and 62 are in this embodiment respectively adapted to engage and seat within the inner annular grooves 48, 56 and the larger annular grooves 42.

The end caps 12 are identical to each other and have an outer diameter of approximately that of barrel 10, and a smooth face 64 on one side for mating with the faces 46, 52 of the diffuser 36 and adaptor 38, respectively. The faces 64 have an inner aperture 66 for receiving filtered fluid or gas, an inner groove 68 for mating with the inner sealing ring 60, and an outer annular groove 70 for mating with the outer sealing ring 62 or rib as suggested above, and a counter-bored opening 72 for receiving the leak trace sensor 16. In addition, an annular groove 74 is also provided between the inner and outer grooves and in alignment and communication with the bore 72. The outer perimeter of the end caps 12 is also provided with a shoulder 76 for receiving a corresponding capture flange 78 of the end nuts 14. End caps 12 also include suitable stiffening webs 80.

The nuts 14 have a threaded inner bore 80 for mating with the threads 40 of barrel 10, and an end wall with an inner bore 82 forming the capture flange 78 for engaging the shoulder 76 of the end caps 12. The outer annular surface 84 of the nuts 14 may be multi-faceted, gnurled, or of any other suitable configuration for aiding in the manual rotation of the nut as it is threaded onto barrel 10.

This embodiment can be implemented using any material suitable to the application. In one embodiment, the barrel 10, diffuser 36, adaptor 38, and end caps 12 are made of a PFA plastic. End nuts 14 are made of a PVDF plastic which is somewhat harder than the PFA. The inner and outer sealing rings 60 and 62 are made of a somewhat softer Teflon or PTFE plastic. The sealing rings 60 and 62 are of a rectangular cross-section, as indicated at 90 in FIG. 3a, or may be tapered or diamond-shaped in cross-section as depicted in FIG. 3b, and the annular grooves 42 and 48, 68 and 70 are inwardly tapered, as indicated in FIGS. 3a and 3b, so as to form compression seals with the rings 90 and 90'.

In an alternative embodiment, the annular seal may be dispensed with in favor of an integrally formed or bonded sealing ring 92 or rib 92', as depicted in FIGS. 4a and 4b. If not formed integral with the end cap 12, it may be bonded directly to the face of one of the members and adapted to mate with a facing groove of the opposite member.

In operation, with the end caps 12 mounted to opposing ends of an external conduit and spaced apart a distance slightly larger than the length of the barrel 10, it will be appreciated that the barrel containing a filter element 32, with diffuser 36 in place at one end and adaptor element 38 in place at the other end, and sealing rings 60 and 62 installed in their corresponding grooves 56 and 42, can be slipped into place between the faces 64 of the end caps 12, and the end caps can be drawn into sealing engagement with the ends of the barrel, and the diffuser and adaptor, by threading a pair of end nuts 14 onto the threads 40 of barrel 10. Similarly, when a filter needs changing, all one need do is back off the nuts 14, releasing the tension on the end caps, freeing the barrel and allowing its removal.

The apparatus may be used either with or without the leak trace sensor 16. If used without the sensor 16, a plug would be provided in bore 72 to prevent leakage in the event of inner seal failure. If the sensors 16 are included, it will be appreciated that any failure of the inner seal 60 at either end will permit leakage into the annular channel 74 and immediately be communicated to the leak trace sensor 16 to be reported by a suitable monitoring apparatus (not shown). In the illustrated embodiment, an optical sensor such as that disclosed in U.S. patent application Ser. No. 899,663 entitled "Optical Leak Detector and Position Sensor" now U.S. Pat. No. 5,343,736, may be used.

Referring now to FIG. 5 of the drawing, application of the sealing principles of the present invention is shown applied to a union-type coupling device including a pair of junction elements 100 and 102, which are of similar configuration to the end caps 12 and diffuser 36/adaptor 38 of the previously described embodiment. Also included is a coupling nut 104 used to draw the junction elements 100 and 102 together in sealing engagement.

Junction element 100 is preferably a molded plastic component having a generally cylindrical central portion 106 widened at 108 to form a mating end flange 110. The external annulus of flange 110 is threaded, as indicated at 112, over at least a portion of its axial length. The end face 114 has at least one annular groove 116 formed therein and preferably both an outer groove 116 and an inner groove 118. End face 114 may also include an annular channel 120. In the preferred embodiment, a pair of laterally extending projections 122 and 124 are provided to form gripping surfaces for holding the junction element. A longitudinally extending bore 126 is provided in element 124 and is tapered at its internal extremity for receiving an optical light trace of the type previously described. Note that the distal extremity 128 of bore 126 is tapered and extends into channel 120 by deforming the plastic material at 130. The deformation 130 allows the tip of an optical sensor inserted into bore 126 to experience a larger detection area of groove 120 and thus increase its sensitivity.

The mating element 102 is preferably likewise a molded plastic component having a generally cylindrical central portion 132 radially widened at 134 to form a mating end flange 136. The external annulus of flange 136 is smooth so as not to interfere with nut 104. The end face 138 is provided with at least one annular rib 140 and preferably a second annular rib 142 aligned with and adapted to mate with the grooves 116 and 118, respectively, of element 100. Note that the ribs 140 and 142 are tapered in the longitudinal direction of element 102 such that the proximal portion of each rib is wider than the distal portion thereof. Moreover, the taper angle of each rib is preferably identical to that of each groove. Ideally, the transverse width of the distal extremity of each rib is slightly larger than the transverse width of the deepest part of each groove so as to ensure ribbed groove interference before bottoming out during the mating closure. Longitudinally extending external ribs 144 are provided on cylindrical segment 132 to provide a means for facilitating rotation of element 102 relative to element 100.

Coupling nut 104 is generally cap-shaped with a central bore 146 for receiving element 102, an interior cavity 148 for receiving the flange portion 136 of element 102, internal threads 150 for mating with the external threads 112 of element 100, and flats or longitudinally extending ribs or gnurling 152 for facilitating rotation of the nut relative to element 100 so as to cause element 102 to clampingly engage element 100. It will of course be appreciated that the mating rib and groove detail of elements 100 and 102 could be reversed. Moreover, the diameter of bore 146 of cap 104 could be increased so as to provide clearance for allowing a sensor bore to extend into the flange 136 of element 102 for leak detection purposes.

In FIG. 6, details of the rib-and-groove construction are enlarged to clearly illustrate the tapered nature of the ribs and grooves. It will of course be appreciated that more than two rib-and-groove combinations can be utilized, and the polarity of one or more of the rib-and-groove mechanisms could be reversed.

Although the present invention has been described above in terms of specific embodiments, it is anticipated that alterations and modifications thereof will no doubt become apparent to those skilled in the art. For example, one might use clamping rings or other mechanisms in place of the threaded nuts 14 and 104. Moreover, the annular grooves 74 might be formed in the faces 46, 52 of the diffuser 36 and adaptor 38, respectively. It is therefore intended that the following claims be interpreted as covering all such alterations and modifications as fall within the true spirit and scope of the invention.

What is claimed is:

1. A coupling device for fluid flow lines, comprising:

a first junction element made of plastic material and having an axial flow path extending therethrough, and terminating at one axial end in means for attachment to a fluid conduit, and at an opposite axial end in a first junction end face having first and second tapered annular grooves formed therein concentric with said axial flow path and respectively disposed proximate the outermost radial dimension and the innermost radial dimension of said first end face, each said annular groove having a tapered cross-section;

a second junction element made of plastic material and having an axial flow path extending therethrough, and terminating at one end in means for attachment to a fluid conduit, and at an opposite end in a second junction end face having first and second annular ribs associated therewith and having a tapered cross-section adapted to mate with said first and second annular grooves, each said rib and each said groove being correspondingly tapered so as to ensure engagement of the sidewalls thereof as said first and second elements are drawn together by said coupling means;

a third annular groove formed in one of said first and second elements;

an optical leak trace sensor extending through one of said first and second junction end faces and into light communicative relationship with said third annular groove; and coupling means for drawing said first junction element and said second junction element toward each other such that said first and second annular means matingly engage corresponding annular grooves in said first junction end face to form a tightly sealed union.

2. A coupling device as recited in claim 1 wherein said first junction element has a portion of its external annulus threaded, and said coupling means includes a rotatable nut having an internal cavity enveloping at least a portion of said second junction element, the internal annulus of said nut being threaded such that upon rotation it will threadably engage the external threads of said first junction element and draw said first and second junction elements together.

* * * * *